(12) United States Patent
Abdulaziz

(10) Patent No.: US 8,662,528 B1
(45) Date of Patent: Mar. 4, 2014

(54) PROTECTIVE SUIT

(71) Applicant: Ali Gh. S. Gh. Abdulaziz, Salwa (KW)

(72) Inventor: Ali Gh. S. Gh. Abdulaziz, Salwa (KW)

(*) Notice: Subject to any disclaimer, the term of this patent is extended or adjusted under 35 U.S.C. 154(b) by 0 days.

(21) Appl. No.: 13/953,705

(22) Filed: Jul. 29, 2013

(51) Int. Cl.
 *B60R 21/16* (2006.01)
 *B60R 21/20* (2011.01)
 *A41D 13/015* (2006.01)

(52) U.S. Cl.
 USPC ............. 280/730.1; 280/735; 2/455; 2/456; 2/462

(58) Field of Classification Search
 USPC ............ 280/730.1, 735; 2/455, 456, 462, 463
 See application file for complete search history.

(56) References Cited

U.S. PATENT DOCUMENTS

| | | | |
|---|---|---|---|
| 3,930,667 A | | 1/1976 | Osuchowski et al. |
| 4,059,852 A | * | 11/1977 | Crane ................. 2/456 |
| 4,299,406 A | | 11/1981 | Thomas |
| 4,825,469 A | * | 5/1989 | Kincheloe .............. 2/456 |
| 5,746,442 A | * | 5/1998 | Hoyaukin ................ 280/730.1 |
| 5,867,842 A | | 2/1999 | Pinsley et al. |
| 5,946,719 A | * | 9/1999 | Crupi et al. .............. 2/6.5 |
| 6,125,478 A | * | 10/2000 | Alaloof .................. 2/456 |
| 6,139,050 A | | 10/2000 | Bultel et al. |
| 6,546,561 B2 | | 4/2003 | Duhamell |
| 6,708,927 B2 | * | 3/2004 | Chen ................... 244/143 |
| 6,783,153 B2 | | 8/2004 | Mattes |
| 6,854,762 B2 | | 2/2005 | Yanagibashi et al. |
| 7,380,291 B2 | | 6/2008 | Hashash |
| 7,401,364 B2 | * | 7/2008 | Goto et al. ............. 2/102 |
| 7,404,570 B2 | | 7/2008 | Miyata |
| 7,445,235 B2 | | 11/2008 | Makabe et al. |
| 7,484,751 B2 | * | 2/2009 | Goto .................... 280/728.1 |
| 7,543,846 B2 | | 6/2009 | Makabe et al. |
| 7,841,344 B2 | * | 11/2010 | Schlosser .............. 128/205.22 |
| 8,348,304 B2 | * | 1/2013 | Kojima et al. .......... 280/735 |
| 2006/0124376 A1 | * | 6/2006 | Goto et al. ............. 180/271 |
| 2009/0055053 A1 | | 2/2009 | Carmeli |
| 2009/0127835 A1 | * | 5/2009 | Lin .................... 280/730.1 |
| 2011/0237194 A1 | * | 9/2011 | Kojima et al. .......... 455/41.3 |
| 2012/0073035 A1 | | 3/2012 | Mazzarolo et al. |

OTHER PUBLICATIONS

Website, www.dainese.com/wd_en/d-air-street, D-Air Street rider protective system, two sheets printed from the internet on Dec. 4, 2012.
Website, www.eggparka.com/english/system/index.html, Airbag system for motorcyclists, three sheets printed from the internet on Dec. 4, 2012.
Website, Spidi protective wear for motorcyclists, two sheets printed from the internet on Dec. 4, 2012.

* cited by examiner

*Primary Examiner* — Toan To
(74) *Attorney, Agent, or Firm* — Richard C Litman

(57) ABSTRACT

The protective suit is for use by persons engaged in various potentially hazardous activities, but is particularly well adapted for wear by motorcyclists and others engaged in motorsports activities. The suit is equipped with airbags that differ from conventional automotive airbags in that the present airbags deflate more slowly to protect the wearer of the suit over a few seconds in an accident. The suit is also equipped with warning lights that are actuated in the event of an accident. The suit is electronically connected to a belt having various electronic systems capable of monitoring the condition of the motor vehicle and the wearer of the suit through sensors in the vehicle and suit. The suit is further electronically connected to the vehicle, the vehicle having a lockout system that prevents the vehicle from being started until the suit, belt, and helmet are properly connected and operable.

18 Claims, 6 Drawing Sheets

PROTECTIVE SUIT

BACKGROUND OF THE INVENTION

1. Field of the Invention

The present invention relates generally to protective apparel, and particularly to a protective suit having various features for protecting the wearer and alerting authorities in the event of an accident.

2. Description of the Related Art

Many people are involved in potentially hazardous activities, either by necessity through their occupations, or as a result of their hobbies or leisure activities. Perhaps the most widely recognized of such activities is motorcycle riding, although many other activities (e.g., rock climbing, certain athletic competitions, etc.) can be hazardous as well.

Accordingly, protective apparel has been developed in the past to protect the person engaged in such potentially hazardous activities. Such protective apparel is generally directed to helmets to protect the head, and standards have been developed for helmets used in many different fields. Complete body apparel has also been developed to a lesser extent, which generally comprises a garment constructed of relatively thick and durable material, such as leather.

The problem with such helmets and suits is that they are passive garments and do not have sensors to determine when an accident occurs and to activate various protective measures in the event of such an accident. Yet, in many cases a person may be engaged in an activity wherein certain readily detectable circumstances place the person at risk. An example of such may occur when riding a motorcycle. The motorcycle will likely provide a relatively smooth ride without excessive accelerative forces in any direction under normal circumstances. However, in the event of an accident the motorcycle (and rider) will experience unusual forces and accelerations not encountered in normal riding. Protective apparel having sensors for such forces and means to reduce those forces on the rider would provide many benefits to the motorcycle rider and others engaged in potentially hazardous activities where sudden abnormal forces might injure the participant.

Thus, a protective suit solving the aforementioned problems is desired.

SUMMARY OF THE INVENTION

The protective suit comprises a coverall-type garment having a plurality of selectively inflatable pockets, i.e., "airbags," disposed over substantially the entire surface. The airbags are not like those found in automotive safety systems, and continue to hold at least some pressure for at least a limited period of time after inflation in order to cushion the wearer of the suit in the event of a motorcycle accident, wherein the rider may be in some danger for perhaps a few seconds until he or she comes to a complete stop.

The suit is equipped with a belt that provides various electronic interfaces with remotely mounted sensors that determine acceleration, velocity, angular tilt, and other factors. The belt is electronically and pneumatically connected to the suit. An explosive or pneumatic charge inflates the airbags of the suit in the event that extreme acceleration or a tilt condition is detected. The suit is also preferably equipped with at least one LED or other suitable light unit(s) that is activated in the event of an extreme condition occurring that triggers the actuation of the airbags of the suit.

The suit is also electronically connected to a helmet. The helmet communicates electronically with the bell through the suit. The helmet may include cameras to record the circumstances of the activity in which the wearer of the suit is engaged and/or the circumstances of any accident that might befall the wearer of the suit. The video recordings may be stored electronically in appropriate electronic apparatus on the belt, e.g., a "smart phone" or the like, with appropriate electronic interfaces.

The suit also preferably includes a number of sensors therein to detect injury to the wearer and to monitor vital signs, such as heart rate, respiration rate, and blood pressure. These conditions may be recorded or transmitted to an emergency facility by the smart phone of the apparatus in the event of an accident and/or anomalous conditions that warrant an emergency response.

In the event that the suit is worn for motorcycle riding or other motorsports activities, the motor vehicle is preferably equipped with various sensors to determine a number of different conditions, as noted further above. The motor vehicle preferably includes an information screen that receives information from the sensors regarding various conditions of the vehicle, and also from the suit regarding various conditions of the wearer of the suit. The suit is preferably connected electronically to the motor vehicle to allow the screen to display such conditions. As a further safety feature, the motor vehicle may include an interlock that will prevent starting the engine until the suit, helmet, and other components are properly connected and determined to be in proper operating condition.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
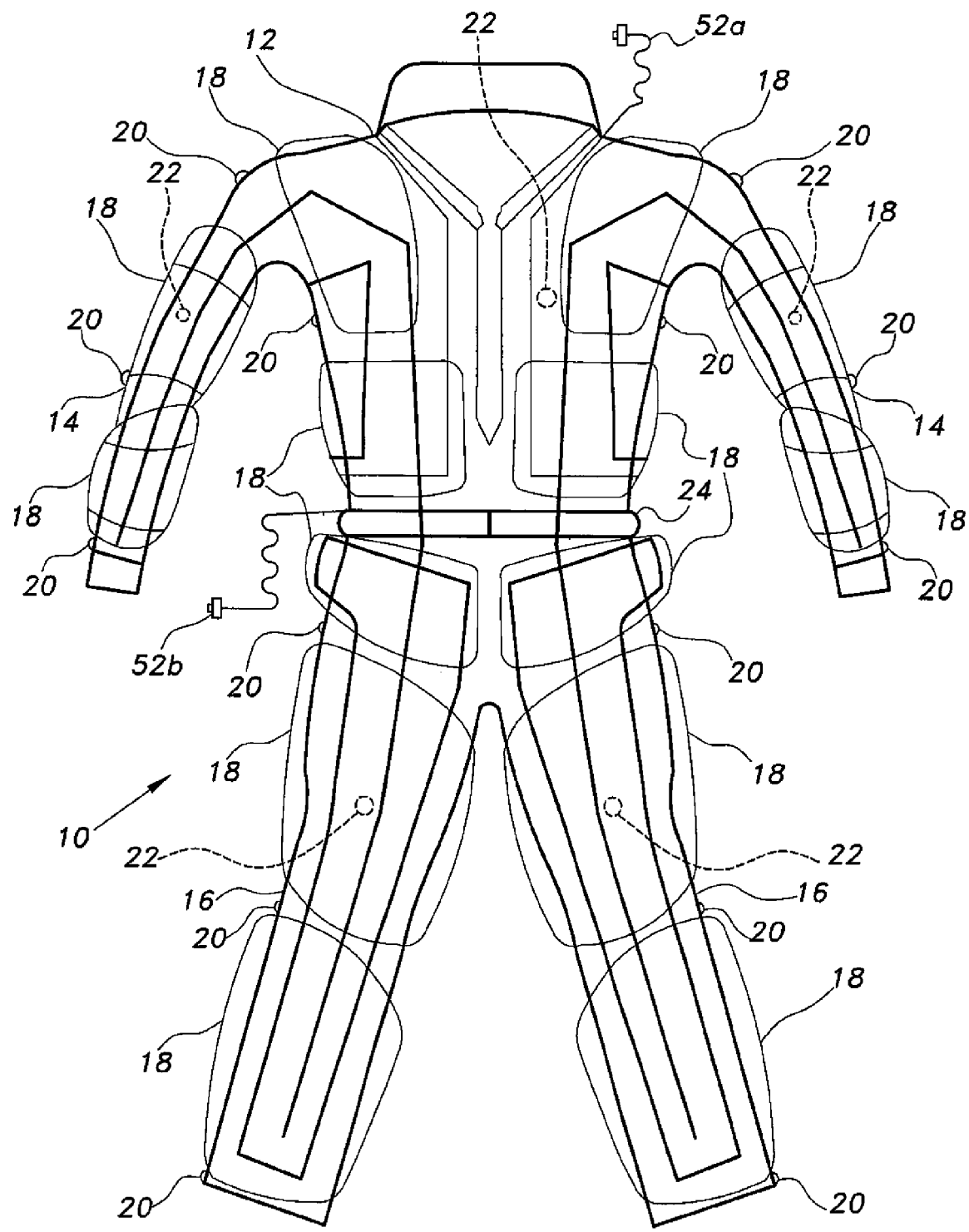
FIG. 1 is a front elevation view of a protective suit according to the present invention, illustrating various features thereof.

The protective suit provides a number of protective features and benefits for motorcycle riders and racers, persons engaged in other motorsports activities, and persons engaged in other potentially hazardous activities, such as rock climbing and the like. FIG. 1 provides a front elevation view of the protective suit 10. The protective suit 10 comprises a coverall-style garment having a torso area 12, long sleeves 14 for the arms, and complete legs 16 to cover the body, with the exception of the head, hands, and feet.

The protective suit 10 further includes a number of selectively inflatable protective cushions or "airbags" 18 disposed upon the torso 12, arms 14, and legs 16. These selectively inflatable cushions serve a similar purpose as conventional "airbags" installed in practically all automobiles and light trucks, and may be operated using the same conventional actuation systems. However, the cushions or airbags 18 are configured to retain their charges of gas somewhat longer than those installed in motor vehicles in order to provide longer term cushioning and protection for the wearer of the suit 10. This is important when considering the conditions under which the suit 10 is likely to be worn. For example, a motorcyclist involved in an accident would likely spend a few seconds or so tumbling across the surface after departing the motorcycle, and a rock climber might spend perhaps two or more seconds in a fall and in contact with the terrain before being stabilized by a belaying rope.

The suit 10 further includes a number of selectively actuated emergency warning lights 20 disposed thereon. The warning lights 20 may be steady or flashing LEDs or other form of warning light, but LEDs provide greater durability and resistance to damage than other lighting devices. The lights 20 may be white, red, or other color(s). The lights 20 may be actuated by the same conventional actuation system used to deploy the airbags or cushions 18. The lights 20 provide additional protection for a person who may be exposed on the roadway after an accident, and who is immobilized by injuries.

The suit 10 is also equipped with a number of vital sign sensors 22 installed therein. These sensors 22 are conventional in operation, and detect such vital signs as respiration, heart rate, and blood pressure. The sensors 22 may be hard wire connected to a sensor belt 24 that is a component of the suit 10 and/or worn with the suit 10, or may communicate with the sensor belt 24 by wireless means.

Figure 2:
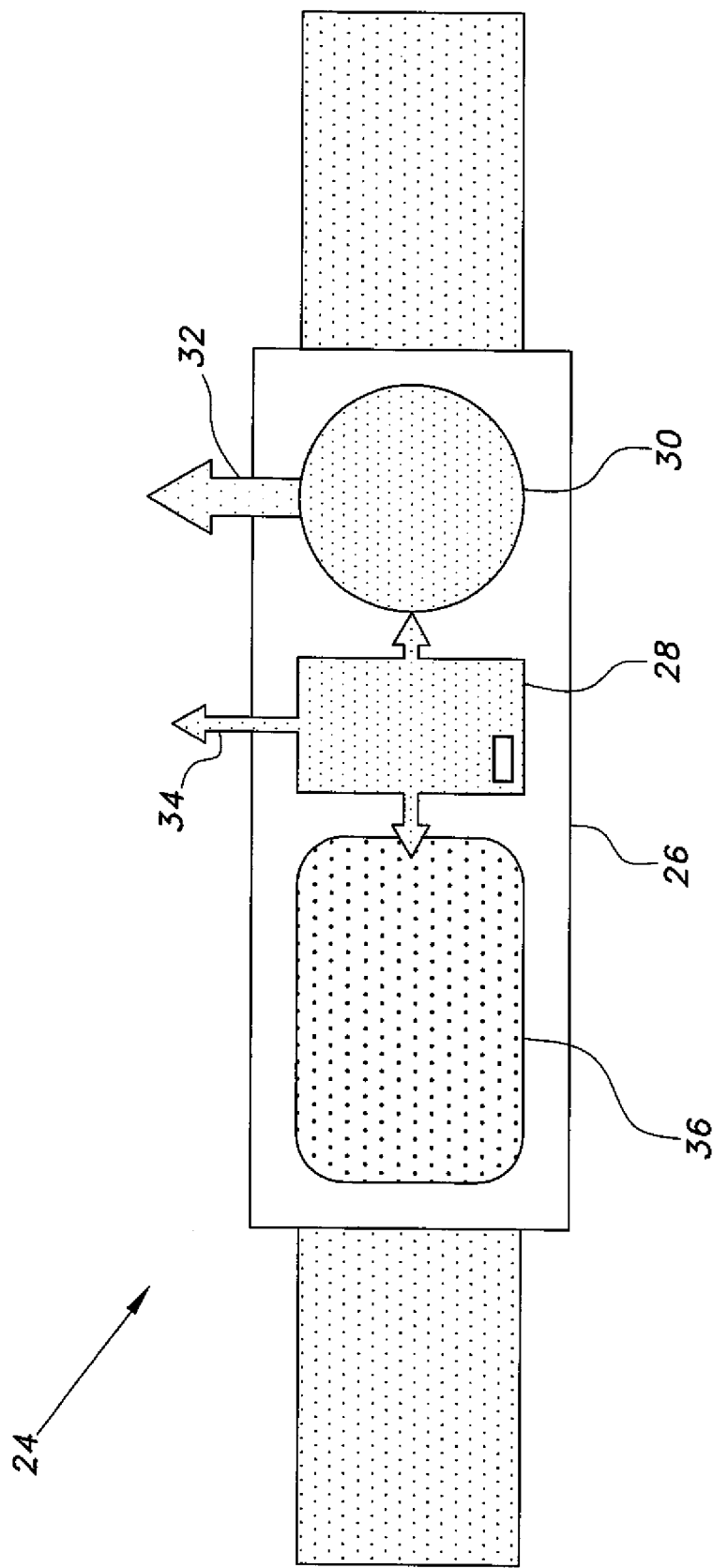
FIG. 2 is a schematic front elevation view of a belt containing various electronic devices for the protective suit according to the present invention.

FIG. 2 of the drawings provides a schematic front elevation view of the sensor belt 24. The belt contains a central portion 26, which is a wide buckle area that also contains various devices enabling the operation of the various features of the suit 10. A central processor 28 may include the conventional accelerometer sensor to sense and register accelerative forces that fall outside of normal operating parameters in order to trigger the airbags 18 of the suit 10 (FIG. 1). The processor 28 communicates with the adjacent pressurized gas or explosive charge 30 on the central portion 26 of the belt 24. The gas or explosive charge 30 is then distributed to the various airbags 18 of the suit 10, as indicated by the outflow arrow 32, when triggered by the processor 28 and its sensor or sensors. The processor 28 also sends a signal(s) to the suit 10 to actuate the warning lights 20 on the suit 10 (FIG. 1), as indicated by the output link 34 from the processor 28.

The processor 28 also communicates with an adjacent "smart phone" 36 or similar device disposed upon the central portion 26 of the belt 24. Such smart phones are seen nearly universally throughout the world's population, and are known to provide numerous computerized functions in addition to their use as a cellular telephone. The present protective suit 10 may make use of such conventional smart phone features and capabilities by interfacing the smart phone 36 with the central processor 28. When the smart phone 36 receives one or more signals from the processor 28 indicating that one or more normal operating parameters have been exceeded, e.g., abnormal acceleration, triggering of the airbag charge 30, etc., the smart phone 36 may be programmed to make an automatic emergency call to alert police, medical assistance, etc. of the accident. The smart phone 36 may also receive data from the central processor 28 relating to the output of the vital sign sensors 22 of the suit 10 (FIG. 1), and automatically alert the appropriate medical authorities if one or more of those vital signs is critical. The vital sign data itself may also be transmitted using conventional smart phone technology.

Figure 3:
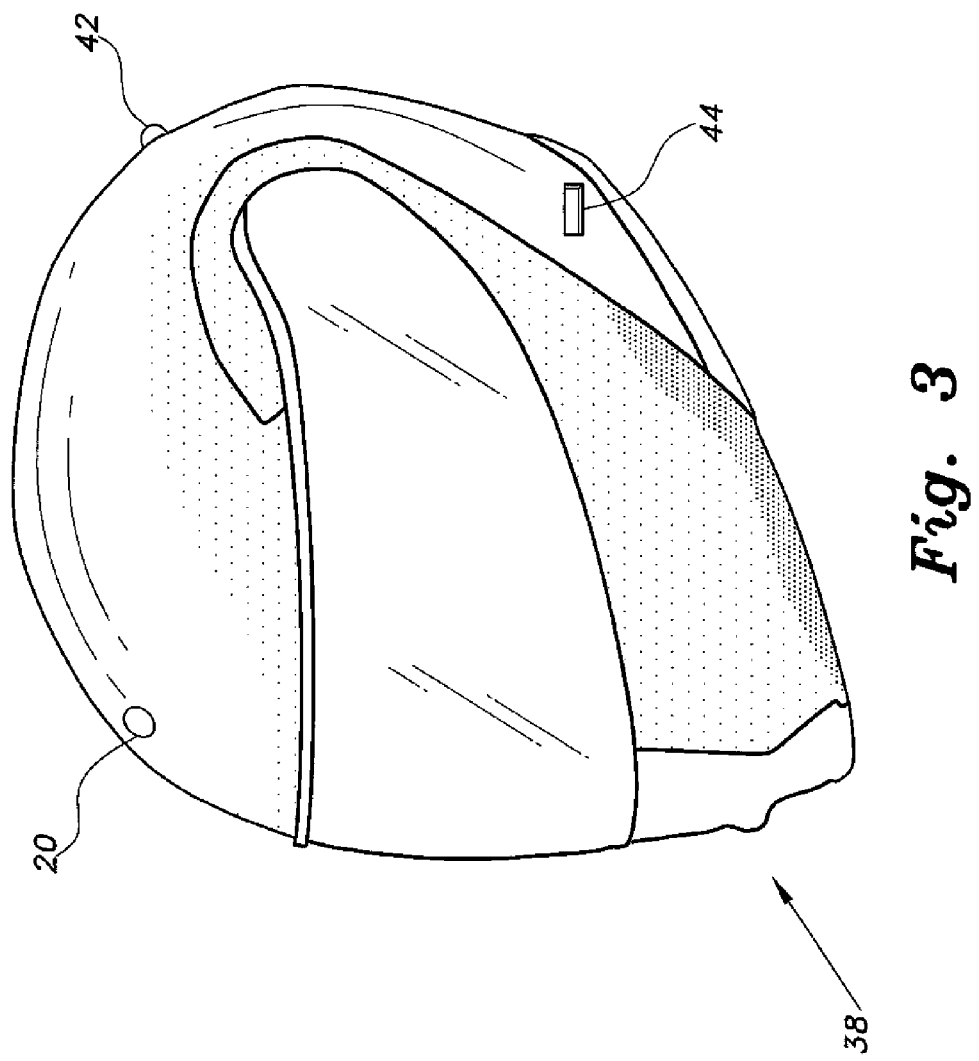
FIG. 3 is a perspective view of a helmet adapted for use with the protective suit according to the present invention.

The protective suit 10 preferably includes a helmet 38, which is illustrated in FIG. 3 of the drawings. The helmet 38 is preferably of conventional construction to meet the safety standards of an appropriate authority, e.g., DOT, Snell Foundation, etc. However, the helmet 38 further includes additional components and features that link with the protective suit 10 when the helmet 38 is worn therewith. The helmet 38 includes a forward camera 40 and an opposite rearward camera 42. The cameras 40 and 42 are miniaturized "lipstick" type video cameras, capable of recording the received video image. As the helmet 38 communicates electronically with the suit 10 via the connector port 44 (the communication between helmet and suit may be by means of a physical cable 52a, shown extending from the upper portion of the suit 10 in FIG. 1, or by wireless, e.g., by Bluetooth) and the suit 10 communicates electronically with the belt 24 and its processor 28, video images from the two cameras 40, 42 may be stored by the processor 28 (and/or by the smart phone 36 that communicates with the processor 28) for further use. In the event of an accident, the video images may be recovered and reviewed to determine the circumstances of the accident, and/or to determine if other unknown parties were involved, etc.

Figure 4:
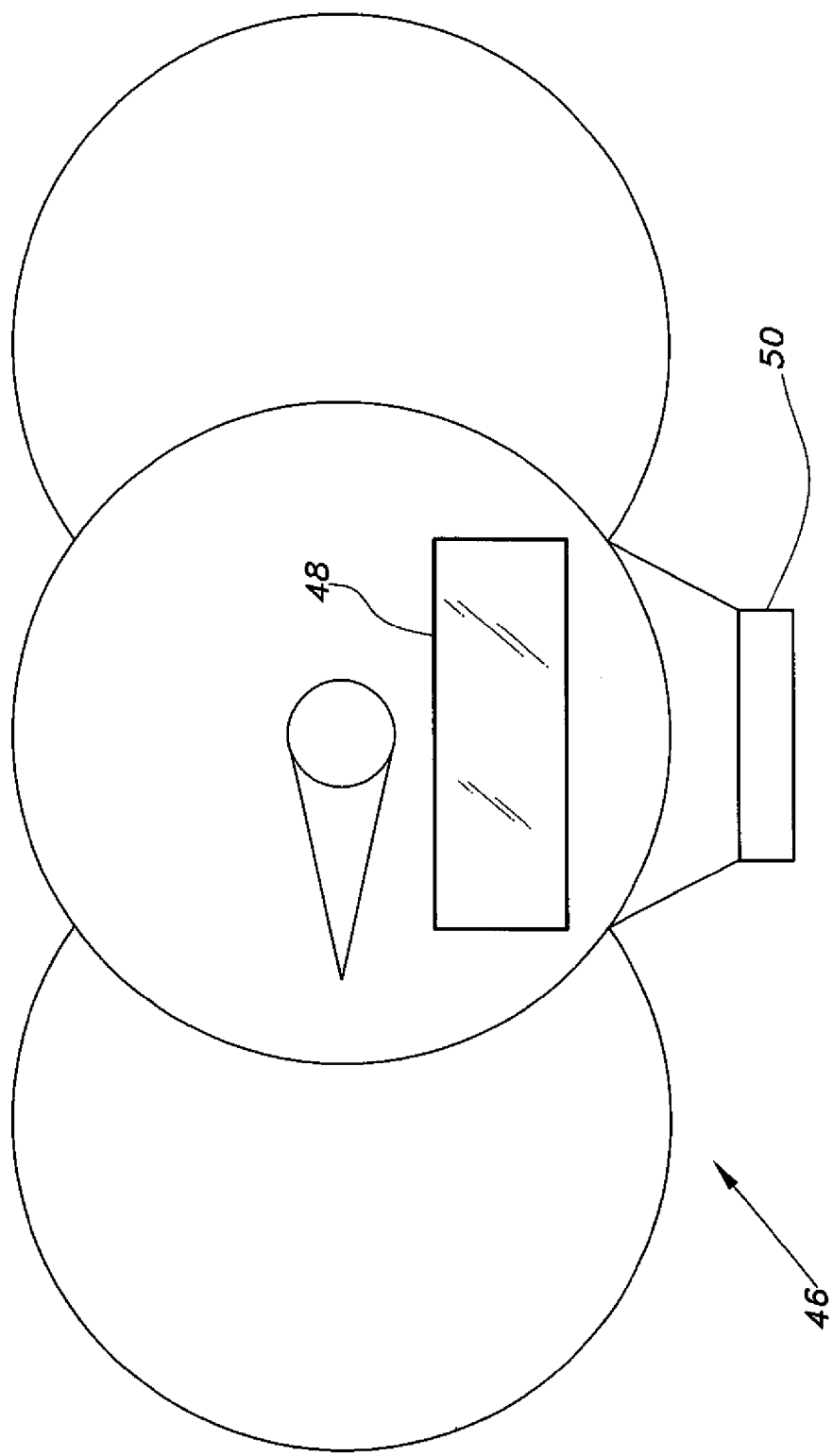
FIG. 4 is a front view of an exemplary instrument display incorporating a display screen showing the status of the protective suit according to the present invention.

FIG. 4 of the drawings provides a front view of the basic components comprising an exemplary instrument display 46 that may be installed upon a typical motorcycle or other type of motor vehicle. The instrument display 46 is remotely disposed from the suit 10 and may comprise a plurality of conventional instruments, e.g., speedometer, tachometer, engine temperature and pressure indicators, etc., but also includes a display screen 48 to display one or more of the vital sign conditions sensed by the sensors 22 in the suit 10 and received by the processor 28 of the belt 24 (FIG. 2). The display screen 48 may also display one or more of the video images received by the front and rear cameras 40 and 42 of the helmet 38 of FIG. 3. The vehicle operator may be most interested in viewing the scene as received by the rear camera 42, and in some circumstances, this may eliminate the need for a rear view mirror(s) on the vehicle. The display screen 48 communicates electronically with the suit 10 by means of an appropriate electrical port or receptacle 50, the suit 10 or its belt 24 having an electrical cable 52b or the like extending therefrom (FIG. 1) to connect to the receptacle 50 of the display screen 48. Alternatively, the communication between the display screen 48 and the suit 10 may be by wireless signals, but the "hardwired" connection provided by the cable 52b is preferred, as described below.

Figure 5:
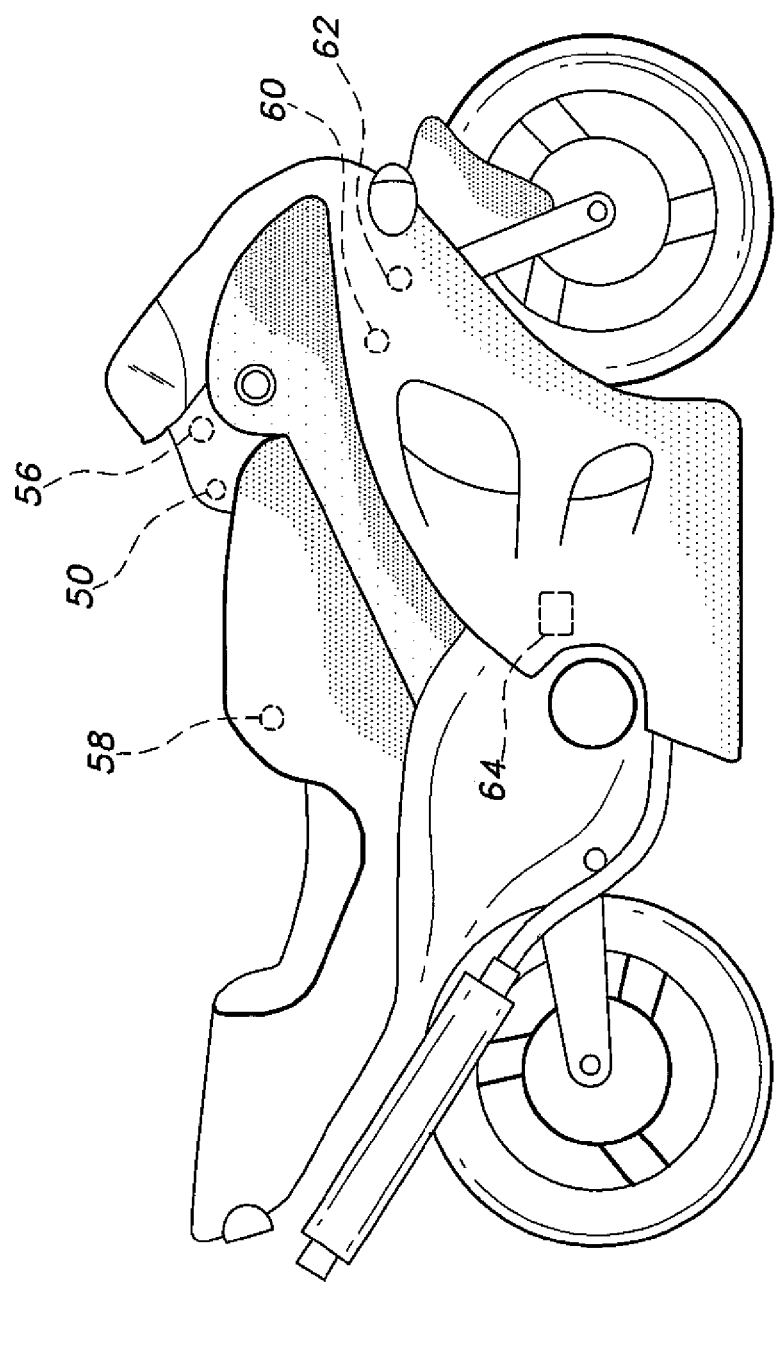
FIG. 5 is a right side elevation view of a motorcycle incorporating various electronic devices that interface with the protective suit according to the present invention.
Figure 6:
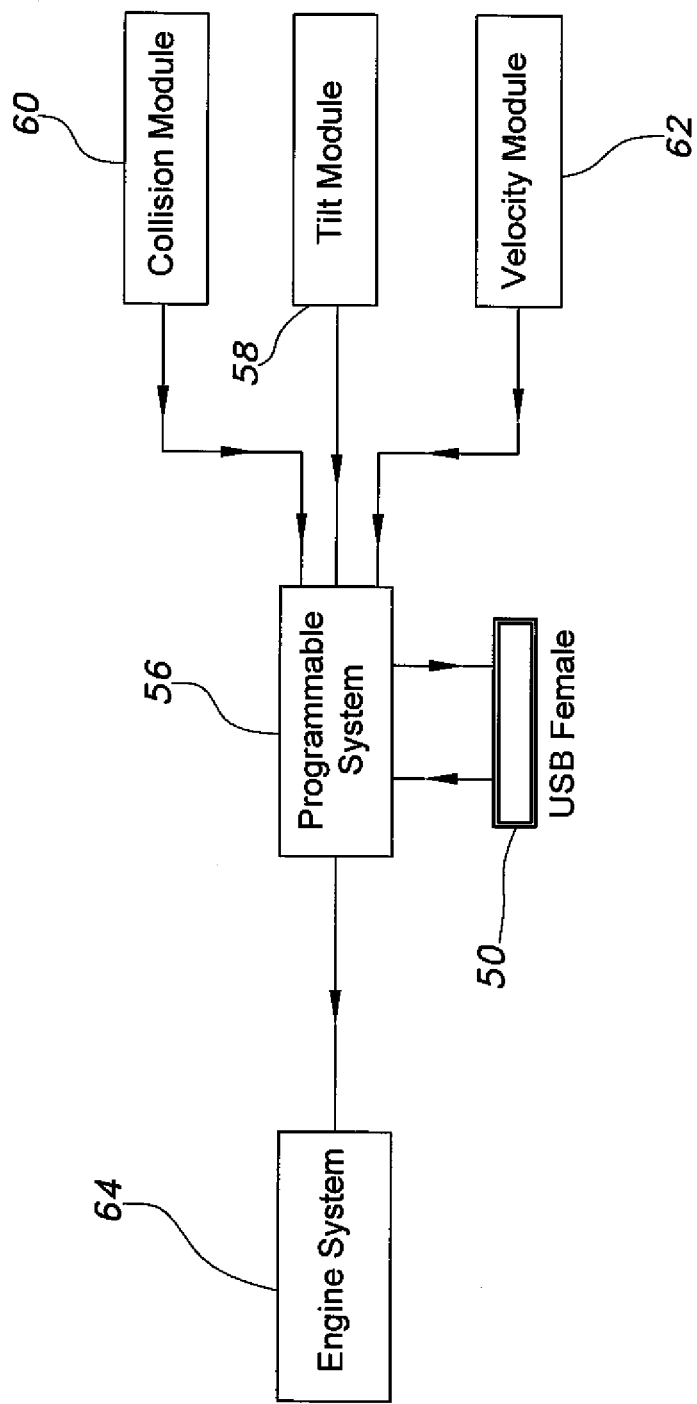
FIG. 6 is a block diagram of the major components associated with the protective suit according to the present invention, showing their relationships with one another.

FIG. 5 of the drawings provides a right side elevation view of an exemplary motorcycle 54 that may be equipped as described above for use with the protective suit 10. FIG. 6 provides a block diagram of the major components associated with the protective suit 10, which may be installed on or in the motorcycle 54. The motorcycle 54 may include a programmable system 56 to enable the user to set limits for various parameters relating to the operation of the motorcycle, e.g., acceleration, tilt or lean, etc. For example, a so-called "dirt bike" operated off-road, would likely encounter considerably higher accelerative forces associated with the uneven ground over which the motorcycle would travel, than would a motorcycle operated on the typical public roadway. The system 56 may be set to account for these differences. Much the same considerations are made for the tilt module or sensor 58, as a grand prix motorcycle with its racing tires will be capable of generating considerably higher lateral forces, and thus considerably greater tilt, than would a standard motorcycle. The tilt sensor or module 58 may be linked to the suit 10 to automatically actuate the airbags 18 and lights 20 of the suit in the event that excessive tilt is detected, thus indicating that the motorcycle 54 has fallen.

The motorcycle 54 may also be equipped with collision and velocity modules, respectively 60 and 62, that communicate electronically with the suit 10 via the programmable system 56 of the motorcycle and the processor 28 of the suit belt 24 (FIG. 2). The collision module 60 is preferably installed at the front of the motorcycle 54, and generates a signal in the event of the detection of impact forces. The velocity module 62 may communicate with the front wheel via the conventional speedometer cable. The programmable system 56 of the motorcycle 54 may be programmed with limits relating to the velocity of the motorcycle as sensed by the velocity module 62, and to detect any impact forces from the collision module 60. When the programmable system 56 detects signals from these components that exceed certain predetermined parameters, the system 56 sends a signal to the processor 28 of the belt 24 via the port or receptacle 50 (FIGS. 4 and 5) and connecting cable 52*b* of the suit 10 (FIG. 1), thus actuating the various safety and warning features of the suit 10. While the velocity alone is not sufficient to activate any of the safety features described further above, it can play a part in determining how quickly or to what extent those features will be activated.

The motorcycle 54 may be provided with a lockout device or system to prevent operation of the motorcycle unless the helmet connection cable 52*a* is connected between the suit 10 and helmet 38 and the suit connection cable 52*b* is connected to the port or receptacle 50 on the motorcycle 54. The connector port or receptacle 50 may serve as the lockout device, e.g., by means of a contact switch within the port or receptacle 50 that is only closed when the mating connector of the cable 52*b* is installed therein. The contact must be closed in order to enable engine starting and running operations for the motorcycle 54, similarly to certain functions well known in automotive systems, e.g., placing the gear selector lever in neutral or park for automatic transmissions, etc.

It is to be understood that the present invention is not limited to the embodiments described above, but encompasses any and all embodiments within the scope of the following claims.

I claim:

1. A protective suit, comprising:
    a garment formed of a durable, wear-resistant material, the garment having a torso portion and sleeves and legs extending therefrom, the garment being adapted for covering the majority of a wearer's body;
    a plurality of selectively inflatable airbags disposed upon the garment;
    a helmet communicating electronically with the garment; and
    a forward-oriented camera and a rearward-oriented camera disposed within the helmet, the cameras communicating electronically with the garment.

2. The protective suit according to claim 1, further comprising:
    a plurality of vital sign sensors disposed within the garment;
    a sensor belt disposed about the garment, the sensor belt communicating electronically with the garment; and
    a remotely disposed display screen communicating electronically with the garment and with the sensor belt, the display screen providing a display of conditions sensed by the vital sign sensors of the garment.

3. The protective suit according to claim 2, further comprising a smart phone disposed on the sensor belt, the smart phone providing notification to emergency authorities when conditions sensed by the vital sign sensors of the garment extend beyond predetermined limits.

4. The protective suit according to claim 1, further comprising a remotely disposed lockout device selectively communicating electronically with the garment, the lockout device preventing operation of associated equipment when the garment is not electronically communicating with the lockout device.

5. The protective suit according to claim 1, further comprising a plurality of selectively actuated emergency warning lights disposed upon the garment.

6. The protective suit according to claim 5, further comprising:
    a motorcycle; and
    a tilt sensor disposed upon the motorcycle, the tilt sensor selectively actuating the airbags and warning lights of the garment when the tilt sensor senses excessive tilt of the motorcycle.

7. A protective suit, comprising:
    a garment formed of a durable, wear-resistant material, the garment having a torso portion and sleeves and legs extending therefrom, the garment being adapted for covering the majority of a wearer's body;
    a plurality of selectively inflatable airbags disposed upon the garment;
    a plurality of vital sign sensors disposed within the garment;
    a sensor belt disposed about the garment, the sensor belt communicating electronically with the garment; and
    a remotely disposed display screen communicating electronically with the garment and with the sensor belt, the display screen providing a display of conditions sensed by the vital sign sensors of the garment.

8. The protective suit according to claim 7, further comprising:
    a helmet communicating electronically with the garment; and
    a forward-oriented camera and a rearward-oriented camera disposed within the helmet, the cameras communicating electronically with the display screen.

9. The protective suit according to claim 7, further comprising a smart phone disposed on the sensor belt, the smart phone providing notification to emergency authorities when conditions sensed by the vital sign sensors of the garment extend beyond predetermined limits.

10. The protective suit according to claim 7 further comprising a remotely disposed lockout device selectively communicating electronically with the garment, the lockout device preventing operation of associated equipment when the garment is not electronically communicating with the lockout device.

11. The protective suit according to claim 7, further comprising a plurality of selectively actuated emergency warning lights disposed upon the garment.

12. The protective suit according to claim 11, further comprising:
    a motorcycle; and
    a tilt sensor disposed upon the motorcycle, the tilt sensor selectively actuating the airbags and the warning lights of the garment when the tilt sensor senses excessive tilt of the motorcycle.

13. A protective suit, comprising:
    a garment formed of a durable, wear-resistant material, the garment having a torso portion and sleeves and legs extending therefrom, the garment being adapted for covering the majority of a wearer's body;
a plurality of selectively inflatable airbags disposed upon the garment;
a forward-oriented camera communicating electronically with the garment;
a rearward-oriented camera communicating electronically with the garment; and
a remotely disposed lockout device selectively communicating electronically with the garment, the lockout device preventing operation of associated equipment when the garment is not electronically communicating with the lockout device.

14. The protective suit according to claim 13, further comprising:
a helmet communicating electronically with the garment;
wherein the forward-oriented camera and the rearward-oriented camera are disposed within the helmet.

15. The protective suit according to claim 13, further comprising:
a plurality of vital sign sensors disposed within the garment;
a sensor belt disposed about the garment, the sensor belt communicating electronically with the garment; and
a remotely disposed display screen communicating electronically with the garment and with the sensor belt, the display screen providing a display of conditions sensed by the vital sign sensors of the garment.

16. The protective suit according to claim 15, further comprising a smart phone disposed on the sensor belt, the smart phone providing notification to emergency authorities when conditions sensed by the vital sign sensors of the garment extend beyond predetermined limits.

17. The protective suit according to claim 13, further comprising a plurality of selectively actuated emergency warning lights disposed upon the garment.

18. The protective suit according to claim 17, further comprising:
a motorcycle; and
a tilt sensor disposed upon the motorcycle, the tilt sensor selectively actuating the airbags and the warning lights of the garment when the tilt sensor senses excessive tilt of the motorcycle.

\* \* \* \* \*